No. 631,818. Patented Aug. 29, 1899.
A. REEVES & A. W. JOHNSON.
KITCHEN UTENSIL.
(Application filed Jan. 9, 1899.)
(No Model.)
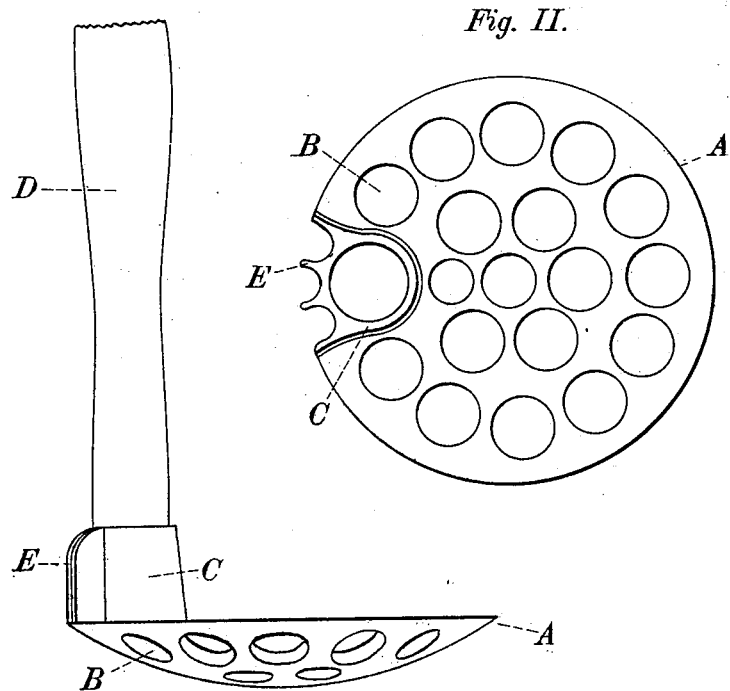
Fig. II.
Fig. I.
Witnesses;
Fred W. Honens
Anne E. Edwards.
Inventors;
Amos Reeves,
Alfred W. Johnson,
By M. J. Manahan
their Attorney.

United States Patent Office.

AMOS REEVES AND ALFRED W. JOHNSON, OF ROCK FALLS, ILLINOIS.

KITCHEN UTENSIL.

SPECIFICATION forming part of Letters Patent No. 631,818, dated August 29, 1899.

Application filed January 9, 1899. Serial No. 701,630. (No model.)

*To all whom it may concern:*

Be it known that we, AMOS REEVES and ALFRED W. JOHNSON, citizens of the United States of America, residing at Rock Falls, in the county of Whiteside and State of Illinois, have invented certain new and useful Improvements in Kitchen Utensils; and we declare the following to be a full, clear, and exact description of the invention, such as will enable others skilled in the art to which it appertains to make and use the same, reference being had to the accompanying drawings, and to the letters of reference marked thereon, which form a part of this specification.

Our invention has reference to improvements in kitchen utensils, and is of that type or class which combines in one tool the functions of several.

Our invention has for its object the production of a kitchen utensil which can be used as a potato-masher, as a skimmer, and also as a meat-pounder.

It has been proven by those who have had experience in handling the usual potato-mashers that the heavy wooden masher is inclined to pack the potatoes or other vegetables being mashed and that better results are obtained by the use of a fork or similarly-formed utensil which will allow the said vegetable to pass through the mashing portion thereof and permit it to assume a desired lightness or fluffiness. Our invention being perforated enables us to obtain this result. By placing the handle upon one side of the disk the utensil can be used as a spoon to lift the mashed vegetables from the kettle, while the concavo-convex form of the disk allows of its use as a skimmer. Better results can be obtained by using a spoon with a vertical handle in removing vegetables from deep kettles than in using the common spoon, whose handle is substantially on a line with the bowl of the spoon. A special provision is made, as hereinafter shown, to permit our invention being used as a meat-pounder. We attain these advantages by the construction shown in the accompanying drawings, in which—

Figure 1 is a side elevation of our invention. Fig. 2 is a plan of the same.

Similar letters refer to similar parts in both views.

A is a disk, preferably manufactured of cast-iron, and is of a concave-convex formation. The disk A is furnished with openings B, through which the material to be mashed can be pressed. These openings can be made of any desired size or shape, but preferably with rounded edges, making it easier to be cleansed. The disk A is also provided with a shoulder or projection C, cast solid to said disk, in which is inserted and rigidly secured a handle D. Said handle is preferably made of wood and can be fastened in the shoulder C by means of a rivet or other suitable fastening. One side of the exterior of the shoulder C is corrugated or provided with a series of ridges E, which extend slightly downward into the outer face of the disk A and form the meat-pounding portion of our invention.

What we claim as our invention, and desire to secure by Letters Patent of the United States, is—

1. In the herein-described utensil, the concavo-convex body A, the perforations B formed therein in concentric circles, the integral socket C at one side of the body A and substantially perpendicular thereto, a series of corrugations on the outer surface of the socket C also perpendicular with the body A, and the handle D seated in said socket as and for the purpose set forth.

2. As a new article of manufacture, a combined potato-masher, skimmer and meat-pounder having the body A of spoon-shaped formation, the perforations B therein, the handle D suitably held in the socket C at one side, the socket C integral with the said body A, the wall of said socket being smooth upon the part adjoining the inside of the body A, and provided with a series of corrugations upon its outer surface substantially as shown and for the purpose described.

AMOS REEVES.
ALFRED W. JOHNSON.

Witnesses:
C. L. MANAHAN,
M. I. MANAHAN.